United States Patent [19]
Leitner

[11] Patent Number: 4,462,710
[45] Date of Patent: Jul. 31, 1984

[54] MOUNTING DEVICE FOR A NUT TO BE PROVIDED ON A METAL PLATE

[76] Inventor: Kajetan Leitner, Am Winacker 18, D-8170 Bad Tölz, Fed. Rep. of Germany

[21] Appl. No.: 549,637

[22] Filed: Nov. 7, 1983

Related U.S. Application Data

[63] Continuation of Ser. No. 200,148, Oct. 24, 1980, abandoned.

[30] Foreign Application Priority Data

Oct. 25, 1979 [DE]  Fed. Rep. of Germany ....... 2943191

[51] Int. Cl.³ .......................... F16B 1/00; F16B 37/04
[52] U.S. Cl. ..................................... 403/21; 403/406; 411/119; 411/123
[58] Field of Search ............... 411/103, 111, 112, 132, 411/134, 84, 85, 87, 88, 90, 92, 119, 123, 127, 131; 403/21, 406, 407

[56] References Cited

U.S. PATENT DOCUMENTS

| | | | |
|---|---|---|---|
| 2,249,923 | 7/1941 | Whitcombe | 411/85 |
| 2,299,158 | 10/1942 | Luce | 411/84 |
| 2,404,372 | 7/1946 | Hallock | 411/103 X |
| 2,409,209 | 10/1946 | Johnson | 411/111 |
| 2,542,375 | 2/1951 | Torresen | 411/84 |
| 2,575,594 | 11/1951 | Reiner | 411/85 |
| 2,705,991 | 4/1955 | Reiner | 411/84 |
| 2,879,820 | 3/1959 | Trzcinski | 411/84 |
| 3,020,946 | 2/1962 | Mills | 411/85 |
| 3,035,624 | 5/1962 | Jaworski | 411/112 |
| 3,036,673 | 5/1962 | Santerre | 403/407 X |
| 3,259,164 | 7/1966 | Hernadi | 411/85 |
| 3,259,166 | 7/1966 | Hernadi | 411/103 |
| 4,193,435 | 3/1980 | Charles et al. | 411/103 X |

FOREIGN PATENT DOCUMENTS

| | | | |
|---|---|---|---|
| 8969 | 7/1879 | Fed. Rep. of Germany | 411/90 |
| 34748 | 4/1929 | France | 411/90 |
| 11841 | 10/1902 | Norway | 411/123 |

Primary Examiner—Gary L. Smith
Assistant Examiner—Lloyd A. Gall
Attorney, Agent, or Firm—Banner, Birch, McKie & Beckett

[57] ABSTRACT

A mounting device for mounting a nut to a plate is disclosed. The plate is formed with a pair of spaced lugs projecting at right angles from the plate. The mounting device is in the shape of a U-bar having a base and a pair of spaced arms extending at right angles from the base. A pair of spaced resilient clamping tongues extend at acute angles from the base. A slot is defined between an end of each tongue and an adjacent edge of the base. One of the lugs is held in each slot by the clamping effect of the associated tongue.

4 Claims, 6 Drawing Figures

MOUNTING DEVICE FOR A NUT TO BE PROVIDED ON A METAL PLATE

This application is a continuation of application Ser. No. 200,148, filed Oct. 24, 1980 now abandoned.

TECHNICAL FIELD

The invention is directed to a mounting device for mounting a nut to a metal plate. The device includes a cage which holds the nut and which is clamped onto the plate. A bolt passes through a hole in the plate to engage the nut held by the cage.

BACKGROUND OF THE INVENTION

Heretofore, this type of mounting device has been designed such that the cage embraces the hole in the plate from the inside. In this type of mounting device, the cage holds the nut on one side of the plate and retaining clips extend through the hole in the plate to the other side of the plate. In many applications, it is necessary to have at one's disposal either side of the plate as a smooth bearing surface. In such applications the clips extending through the hole in the plate are inconvenient. Moreover, in the event the cage rises laterally only slightly above the nut and the plate is made from a relatively soft material, e.g. aluminum, the nut together with the cage may bend through when the bolt is screwed firmly up to the bearing surface.

SUMMARY OF THE INVENTION

The object of the invention is to provide a mounting device of the type mentioned above, in which one side of the plate to which the device is attached remains free and which, moreover, offers a large bearing surface for the absorption of the pressure exerted by the nut on the plate.

According to the invention, the mounting device is attached to a plate in which two opposite lugs are stamped out such that they project from the plate substantially at right angles to the side of the nut held by the device. The mounting device is comprised of a cage which is formed as a U-bar having a substantially rectangular cross section. The U-bar has a base from which a pair of arms extend. When the cage is attached to the plate, the base is in flatwise abutting engagement with the plate. A hole for the bolt is formed in the middle of the base, and resilient clamping tongues are sheared out of and inclined away from the base. The tongues point toward the nut, which is located between the ends of the tongues. The lugs of the plate are clamped in between slots formed by an edge of the base at the border of the hole and the ends of the clamping tongues. The arms of the U-bar, at least in the zone of the hole in the base, have inwardly pointing bent portions over the nut.

In this design, since the lugs have been stamped out of the plate and are clamped in the slots of the cage, the components of the mounting device are disposed only on one side of the plate, with the other side of the plate remaining free. Due to the U-shaped cross section of the U-bar, it forms a very stiff component with a comparatively large bearing surface, so that pressure exerted by the nut on the U-bar is distributed over a correspondingly large surface of the plate. The hole, which results from the stamping out of the lugs from the metal plate, serves as the throughhole for the bolt. Due to its construction, the cage securely holds the nut because the ends of the clamping tongues can prevent the nut from slipping out of the U-bar in the longitudinal direction, and the bent portions of the arms of the U-bar prevent the nut from falling out of the open side of the U-bar.

To prevent excessive play of the nut in the longitudinal direction of the U-bar, stays or struts protruding from the U-bar may be provided in the longitudinal direction of the U-bar in front and in back of the nut. The stays prevent the nut from having excessive play in the longitudinal direction so that, while the mounting device is being attached to a metal plate, the nut can be moved only a limited degree to prevent it from covering a slot in the cage, since this would make it difficult for the particular lug to slip into the slot. Preferably, the stays are bent out of the arms of the U-bar.

BRIEF DESCRIPTION OF THE DRAWINGS

A practical embodiment of the invention is shown in the figures, wherein.

DETAILED DESCRIPTION OF A PREFERRED EMBODIMENT

Figure 1:
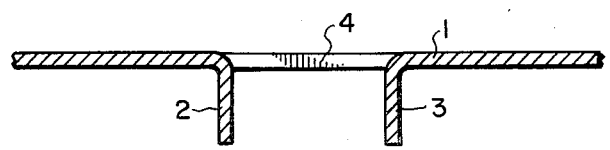
FIG. 1 is a cross-sectional view of a plate with stamped-out lugs taken along the line I—I in FIG. 2.
Figure 2:
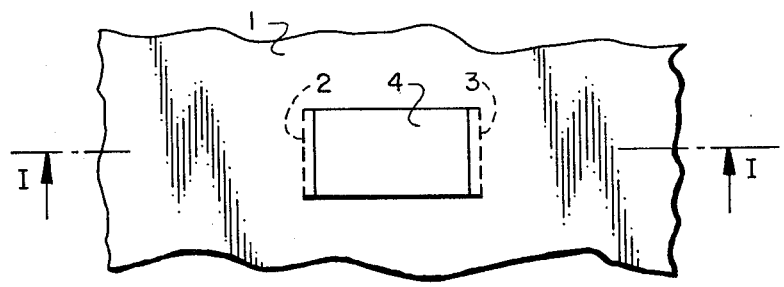
FIG. 2 is a plan view of the metal plate.

In FIG. 1 a metal plate 1 is shown in section. Lugs 2 and 3 have been stamped out of metal plate 1. The free space between lugs 2 and 3, which results from the stamping out of lugs 2,3 forms a hole 4 for the subsequent passage of a bolt. Lugs 2 and 3 project at right angles to plate 1.

Figure 3:
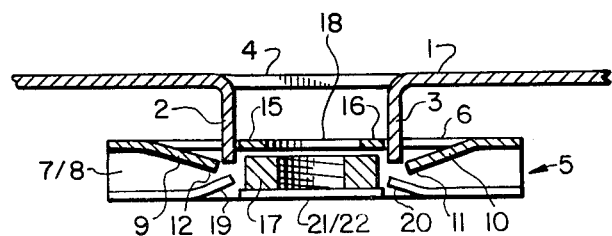
FIG. 3 is a longitudinal sectional view of the combination of the metal plate and the cage, wherein the cage has been partially placed on the lugs.

Details of a cage in the form of U-bar 5 will be discussed with reference to FIGS. 4 and 5. U-bar 5 has a substantially rectangular cross section and is comprised of base 6 and two arms 7 and 8 extending from base 6 at right angles. A pair of clamping tongues 9 and 10 are punched out of base 6. Clamping tongues 9 and 10 extend at an acute angle from base 6 toward one another, and have ends 11 and 12 which are spaced from one another and from base 6. A hole 18 is formed in base 6 at a location between ends 11,12 of clamping tongues 9 and 10, and forms a through-passage for a bolt. A web 15 is located on one side of hole 18, between hole 18 and end 12 of tongue 9; and a web 16 is located on the other side of hole 18, between hole 18 and end 11 of tongue 10. Webs 15, 16 support a nut 17 over hole 18 and form a surface against which nut 17 can be tightened. A slot 13 is defined between the edge of web 15 and end 12 of tongue 9; and a slot 14 is defined between the edge of web 16 and end 11 of tongue 10. Slots 13 and 14, as seen in FIGS. 3 and 6, are shaped and sized to receive lugs 2 and 3 respectively. Once lugs 2 and 3 are inserted into slots 13 and 14, ends 11 and 12 of clamping tongues 9 and 10 abut against the lugs to lock the lugs in place.

Nut 17 is held in U-bar 5 with a certain degree of play so that, after mounting U-bar 5 on metal plate 1, nut 17 can be directed towards a given position of the bolt which is inserted through holes 4 and 18. Nut 17 is held in the longitudinal direction of U-bar 5 by stays or struts 19 and 20 which are bent out of arms 7 and 8. Stays 19 and 20 project toward nut 17 a sufficient distance so that nut 17 cannot move far enough laterally to cover slots 13 and 14, because this would impede the insertion of lugs 2 and 3 into slots 13 and 14. However, it is also possible to dispense with stays 19 and 20 and to let clamping tongues 9 and 10 secure nut 17 in the longitudinal direction of U-bar 5. Furthermore, nut 17 is secured by bent portions 21 and 22, which have been bent out of arms 7 and 8. Bent portions 21 and 22 prevent nut 17 from falling out of the open side of U-bar 5 transverse to its longitudinal direction.

Figure 4:
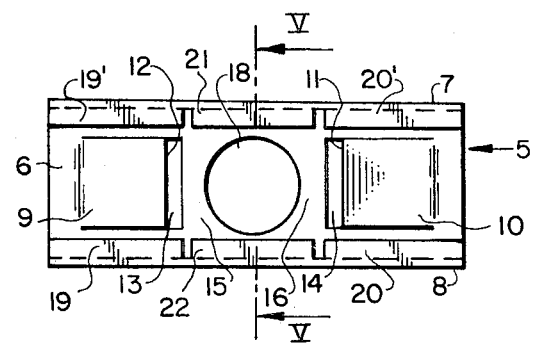
FIG. 4 is a bottom plan view of only the cage shown in FIG. 3.
Figure 5:
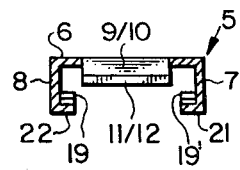
FIG. 5 is a cross-sectional view of the cage taken along the line V—V in FIG. 4.
Figure 6:
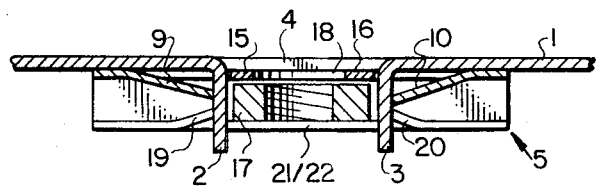
FIG. 6 is a longitudinal sectional view of the combination of the metal plate and the cage, wherein the cage has been completely fastened to the metal plate.

As is apparent from FIGS. 4 and 5, bent portions 21 and 22 as well as stays 19, 20 and 19', 20' consist of inwardly bent parts of arms 7 and 8. This form of bent portions 21 and 22, and of stays 19, 20 and 19', 20' imparts further stability to arms 7 and 8 which, in turn, stiffen base 6. As a result, an extremely stiff and stable component is obtained. Stays 19, 20 or 19', 20' are shown as pairs of components lying opposite one another in the longitudinal direction of U-bar 5. However, it is also possible to position stays diagonally, because in this case nut 17 would also be secured in the longitudinal direction of U-bar 5. Also, stays 19, 20 and 19', 20' can be punched out of the parts of arms 7 and 8 which extend at right angles to base 6.

FIG. 6 shows U-bar 5 fully inserted onto lugs 2 and 3. As is apparent from this figure, resilient clamping tongues 9 and 10 contact one side of the lugs 2 and 3 to support lugs 2 and 3 inwardly against webs 15 and 16. Stays 19 and 20 are disposed with their ends behind lugs 2 and 3 and extend almost up to the internal surface of lugs 2 and 3 so that, upon removal of U-bar 5, the stays give nut 17 only limited clearance of motion in the longitudinal direction of U-bar 5, which extends only up to slots 13 and 14 (FIG. 4).

U-bar 5 is preferably made from spring sheet steel. When fitted onto metal plate 1, U-bar 5 is held thereon by the propping effect of clamping tongues 9 and 10 and forms an additional backing for metal plate 1. It is then possible, without further provision and by means of a bolt passing through nut 17, to fasten any component to metal plate 1 on its side facing away from U-bar 5. FIGS. 5 and 6 clearly show that such a component can be in flatwise abutting engagement with metal plate 1.

Nut 17 is preferably a square nut which, owing to its shape, is prevented from turning between lugs 2 and 3.

The mounting device according to the invention is particularly suited for mounting on aluminum plates and is being widely applied in automotive engineering, e.g., for doors. Welding of bolts such as customarily applied in automotive engineering in conjunction with sheet iron is out of the question when aluminum is used, because of the special precautions which are required in welding aluminum. The mounting device provided by the invention enables extenal parts to be screwed on aluminum plates without protruding components interfering with the surface turned toward such parts. This mounting device has the further advantage that it reinforces with its own strength the site where the lugs have been punched out.

I claim:

1. A mounting device for mounting a nut to a plate comprising:

a plate and a mounting cage;

said plate having a hole through which a bolt can pass to the nut and a pair of spaced lugs projecting at substantially right angles to the major surface of the plate;

said mounting cage having the shape of a U-bar with a substantially rectangular cross section including a base and a pair of arms extending from the base at substantially right angles to the base at spaced locations between which the nut can be held, said cage being clamped to said plate with a first surface of said base opposite to the direction in which said arms extend facing said plate;

a hole formed in the base of said cage in alignment with the hole in said plate for the passage of the bolt, resilient clamping tongues extending at an acute angle from an opposite second surface of said base, said tongues extending toward one another and having ends spaced from the base and from one another;

a slot for the passge of one of the lugs being located on each side of said hole, each slot being defined between an edge of said base and an end of one of said tongues, each slot receiving one of the lugs and preventing the removal of the lug to hold said cage clamped to said plate;

said arms, in at least the region of the hole in said base, having an inwardly bent portion overlying said base and extending over the nut.

2. A mounting device according to claim 1 wherein stays extend into the interior area of said U-bar on either longitudinal side of the nut to hold the nut in longitudinal alignment between said stays.

3. A mounting device in accordance with claim 2 wherein said stays are bent from said arms.

4. A mounting device in accordance with claim 2 or 3 wherein said stays are located to hold the nut with a limited amount of play but preventing the nut from overlying said slots in said base.

* * * * *

UNITED STATES PATENT AND TRADEMARK OFFICE
CERTIFICATE OF CORRECTION

PATENT NO. : 4,462,710

DATED : July 31, 1984

INVENTOR(S) : Kajetan Leitner

It is certified that error appears in the above—identified patent and that said Letters Patent is hereby corrected as shown below:

In Claim 4, Col. 4, lines 48 and 49, delete "or 3".

Signed and Sealed this

Nineteenth Day of March 1985

[SEAL]

Attest:

DONALD J. QUIGG

Attesting Officer — Acting Commissioner of Patents and Trademarks